E. P. FOWLER.
BREAST PUMP.
APPLICATION FILED OCT. 3, 1908.
940,454.
Patented Nov. 16, 1909.
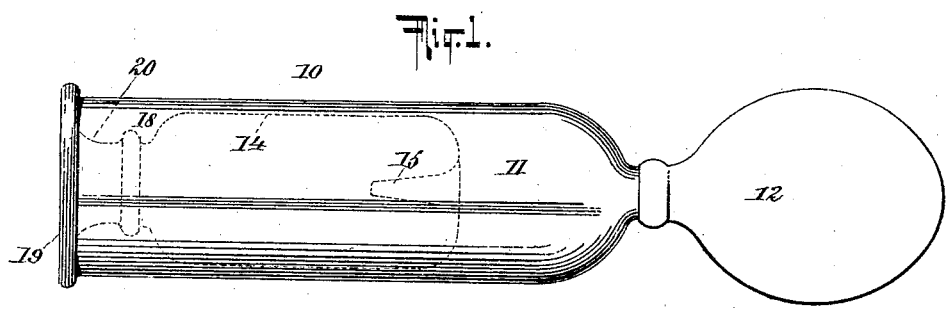
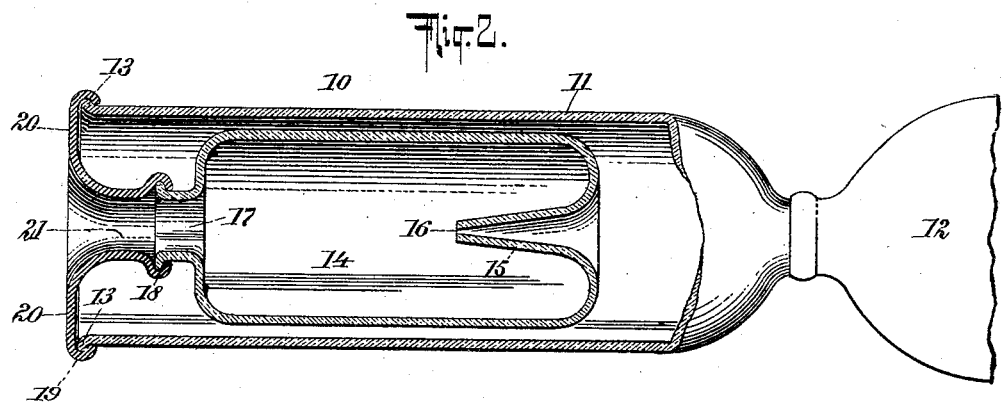
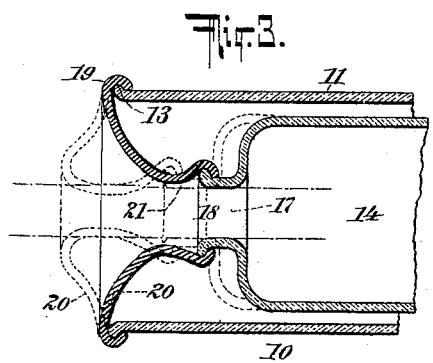
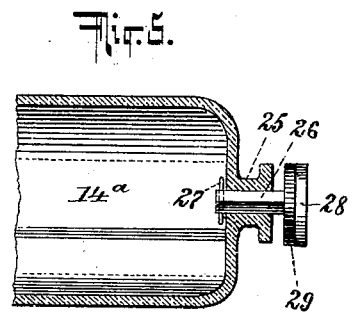
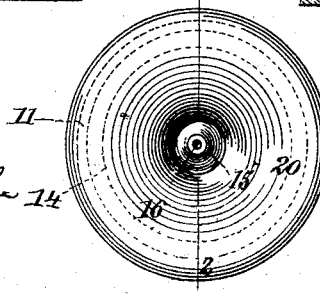
WITNESSES:
Edwin H. Dietrich
George Bambay
INVENTOR
Edmund P. Fowler
BY
Conrad A. Dietrich
his ATTORNEY

UNITED STATES PATENT OFFICE.

EDMUND P. FOWLER, OF NEW YORK, N. Y.

BREAST-PUMP.

940,454.  Specification of Letters Patent.  Patented Nov. 16, 1909.

Application filed October 3, 1908.  Serial No. 455,988.

*To all whom it may concern:*

Be it known that I, EDMUND P. FOWLER, a citizen of the United States, residing at the city of New York, borough of Manhattan, in the county and State of New York, have invented certain new and useful Improvements in Breast-Pumps, of which the following is a full, clear, and exact specification.
My invention relates to improvements in milking devices, and the same has for its object more particularly to provide a simple, efficient and reliable device which may be readily and conveniently attached to the breast and removed therefrom without causing pain or injury to the person.

Further, said invention has for its object to provide a breast pump which in its operation simulates the movement and action of an infant's mouth and lips in the act of nursing.

Further, said invention has for its object to provide a breast pump, by means of which the breast is relieved of its milk by suction produced within the apparatus combined with pressure exerted by said apparatus about the base of the nipple.

To the attainment of the aforesaid objects and ends my invention consists in the novel details of construction, and in the combination, connection and arrangement of parts hereinafter more fully described and then pointed out in the claims.

In the accompanying drawings forming part of this specification, wherein like numerals of reference indicate like parts, Figure 1 is a side view showing one form of breast pump made according to and embodying my said invention; Fig. 2 is a similar view on a large scale and partly broken away and in section, taken essentially on the line 2—2 of Fig. 4; Fig. 3 is an enlarged detail sectional view showing the inner receptacle in full lines drawn inwardly to substantially its innermost position, and in dotted lines to its projected or forward position; Fig. 4 is an end view of the pump, and Fig. 5 is a detail sectional view showing the inner end of the inner receptacle and the valve therein.

In said drawings 10 designates the apparatus as a whole comprising an outer cylindrical receptacle 11 preferably made of glass, having one end closed and provided with a nipple to receive a bulb 12, or one end of a tube leading to a suitable pump, and the other end of said receptacle open and provided with an outwardly extending rim or bead 13. Within the outer receptacle 11 is disposed a shorter inner cylindrical receptacle 14 also preferably made of glass, and of slightly smaller diameter than said outer receptacle. Said inner receptacle 14 has its rear end introverted to form a tapering portion 15 extending a substantial distance into said receptacle, and provided at its end with a small aperture 16, for the passage of the air from the outer receptacle 11 to said inner receptacle 14, and vice versa, when the bulb 12 is compressed and then permitted to return to its normal condition. Said inner receptacle 14 is provided at its forward end with a reduced neck 17 having an outwardly projecting rim or bead 18 at its end, and 19 denotes a flexible diaphragm preferably made of rubber comprising a flat, circular portion 20 from the center of which extends inwardly a tubular portion 21, whose internal diameter corresponds substantially with that of the neck 17. The outer edge of said flat, circular portion is stretched over, and engages the rim or bead 13 of said outer receptacle, and has the end of its tubular portion 21 stretched over and engaging the rim or bead 18 on the neck 17 of said inner receptacle.

As shown in Fig. 5 the inner receptacle 14ᵃ is provided at its rear or inner end with a projection 25 having a circular aperture therein within which is arranged a square valve stem 26 provided at its inner end with a stop 27, and at its outer end with a head 28 having a valve face 29 thereon adapted to seat against the end of said projection 25.

The operation of the apparatus is as follows: When not in operation the normal positions of the parts are as shown at Fig. 1. When the pump is to be applied to the breast the bulb 12 is compressed whereby the inner receptacle 14 will be caused to move forwardly, and the tubular portion 21 to become constricted, as indicated by dotted lines at Fig. 3. The bulb 12 is then maintained compressed until the air pressures in the receptacles 11 and 14 balance owing to the escape of the air from one receptacle to the other through the aperture 16 in the inner receptacle 14. At about the same time the tubular portion 21 will have expanded again to its normal diameter with the nipple of the breast in position therein. By quickly releasing the bulb 12 (which has been maintained constantly compressed) a difference in pressure will be produced in the receptacles 11 and 14 which is sufficient to hold the breast surrounding the base of the nipple tightly against the portion 20 of the diaphragm, and the nipple itself drawn properly into the portion 21 thereof. Hereupon, the bulb is again compressed and the air pressure in the outer receptacle 11 being increased has the tendency to move the inner receptacle 14 forward, and at the same time force the portion 20 of the diaphragm 19 outward against the breast, and cause the tubular portion 21 to become constricted due to the air pressure being greater within the receptacle 11 than in the receptacle 14, and to the slight forward or outward movement of said tubular portion itself thereby compressing the nipple, and as the pressure upon the bulb 12 is released the receptacle 14 moves inward again, as shown in full lines at Fig. 3, owing to the difference in pressures, and in being so drawn inward the tubular portion 21 widens slightly and reduces the pressure upon the nipple and causes the milk to be drawn into and retained in the receptacle 14 owing to the manipulation of the nipple by the tubular portion 21 of the diaphragm 19, and the partial vacuum in the receptacle 14. This operation may be continued until sufficient quantity of milk has been obtained, whereupon the device may be removed by a full compression of the bulb, and the entire apparatus held in position so that the liquid level shall remain below the opening 16 in the projecting portion 15 in the base thereof, and the milk discharged from the apparatus through its neck 17, and the tubular portion 21 of the diaphragm 19.

To facilitate the removal of the pump from the breast, the outer receptacle 11 may be provided with an aperture which may be closed by a finger while the pump is in operation.

Having thus described my invention, what I claim and desire to secure by Letters Patent is:

1. A breast pump comprising a plurality of receptacles, means yieldingly connecting said receptacles adapted to engage a nipple, and means for varying the fluid pressures in said receptacles, substantially as specified.

2. A breast pump comprising a plurality of receptacles, means yieldingly connecting said receptacles at one end adapted to engage a nipple, and means for varying the fluid pressure in said receptacles, substantially as specified.

3. A breast pump comprising a plurality of receptacles, means yieldingly connecting said receptacles at one end adapted to engage a nipple, and a compressible member secured to one of said receptacles, substantially as specified.

4. A breast pump comprising an outer receptacle, and an inner receptacle, a diaphragm connecting said receptacles together at one end, and means for varying the fluid pressure within said outer receptacle to actuate said inner receptacle and said diaphragm, substantially as specified.

5. A breast pump comprising an outer receptacle and an inner receptacle, an elastic diaphragm connecting said receptacles at one end adapted to engage a nipple, and a compressible member connected to said outer receptacle whereby to actuate said inner receptacle, substantially as specified.

6. A breast pump comprising an outer receptacle, and an inner receptacle provided with an aperture, an elastic diaphragm connecting said receptacles at one end, and means for varying the pressure of the operating fluid in said outer receptacle to actuate said inner receptacle, substantially as specified.

7. A breast pump comprising an outer receptacle, and an inner receptacle movably arranged therein, an elastic diaphragm connecting said receptacles at one end, and means for varying the pressure of the operating fluid in said receptacles to actuate said inner receptacle and diaphragm, substantially as specified.

8. A breast pump comprising an outer receptacle, and an inner receptacle movably arranged therein, and provided at one end with an aperture and at its other end with a reduced neck, an elastic diaphragm connected to said outer receptacle at one end thereof, and to the neck on said inner receptacle, and means for varying the pressure of the operating fluid in said receptacles to actuate said inner receptacle and diaphragm, substantially as specified.

9. A breast pump comprising an outer receptacle, and an inner receptacle movably arranged therein and provided at one end with an aperture and at its other end with a reduced neck, an elastic diaphragm connected to said outer receptacle at one end thereof, and to the neck on said inner receptacle, and a compressible member secured to said outer receptacle, substantially as specified.

10. A breast pump comprising an outer receptacle and an inner receptacle movably arranged therein and provided at one end with an opening for controlling the passage of the operating fluid from said outer receptacle to said inner receptacle, and at its other end with a reduced neck, an annular diaphragm connected to one end of said outer receptacle and to the neck on said inner receptacle, and a compressible member adapted for securement to said outer receptacle, substantially as specified.

11. A breast pump comprising an outer receptacle and an inner receptacle movably arranged therein and provided at its inner end with an inwardly extending tapered portion having an opening, and at its opposite end with a reduced neck, an annular diaphragm connected to one end of said outer receptacle and to the reduced neck of said inner receptacle, and a bulb connected to said outer receptacle for actuating said pump, substantially as specified.

12. A breast pump comprising an outer receptacle, and an inner receptacle movably arranged therein and provided at one end with a constricted portion having an opening for controlling the passage of the operating fluid from said outer to said inner receptacle, and at its other end with a reduced neck, an annular diaphragm connected to one end of said outer receptacle, and to the neck on said inner receptacle, and a compressible member adapted for securement to said outer receptacle, substantially as specified.

13. A breast pump comprising an outer cylindrical receptacle, an inner receptacle movably arranged therein having at one end an opening communicating with said outer receptacle, a valve for said opening and at its opposite end a reduced neck, an annular elastic diaphragm connected to one end of said outer receptacle, and the neck of said inner receptacle, and a bulb connected to said outer receptacle for actuating said pump, substantially as specified.

Signed at the city of New York, in the county and State of New York, this twenty-fifth day of September, nineteen hundred and eight.

EDMUND P. FOWLER.

Witnesses:
CONRAD H. DIETERICH,
A. R. ANGUS.